(12) United States Patent
Watanabe et al.

(10) Patent No.: US 8,830,635 B2
(45) Date of Patent: Sep. 9, 2014

(54) MAGNETIC HEAD HAVING SHIELD LAYER(S) WITH LOW COEFFICIENT OF THERMAL EXPANSION AND MAGNETIC STORAGE APPARATUS HAVING SAME

(75) Inventors: Katsuro Watanabe, Hitachiohta (JP); Katsumi Hoshino, Matsuda-machi (JP); Masafumi Mochizuki, Chigasaki (JP)

(73) Assignee: HGST Netherlands B.V., Amsterdam (NL)

( * ) Notice: Subject to any disclaimer, the term of this patent is extended or adjusted under 35 U.S.C. 154(b) by 2131 days.

(21) Appl. No.: 11/807,744

(22) Filed: May 29, 2007

(65) Prior Publication Data

US 2007/0297097 A1 Dec. 27, 2007

(30) Foreign Application Priority Data

May 29, 2006 (JP) ................................ 2006-147893
Nov. 14, 2006 (JP) ................................ 2006-307359

(51) Int. Cl.
*G11B 5/33* (2006.01)
*G11B 5/127* (2006.01)

(52) U.S. Cl.
CPC .................................. *G11B 5/1278* (2013.01)
USPC ........................................................ 360/319

(58) Field of Classification Search
None
See application file for complete search history.

(56) References Cited

U.S. PATENT DOCUMENTS

| | | | |
|---|---|---|---|
| 4,195,323 A * | 3/1980 | Lee ................................ | 360/319 |
| 6,172,859 B1 * | 1/2001 | Watanabe et al. ........... | 360/327.3 |
| 6,707,649 B2 | 3/2004 | Hasegawa et al. | |
| 6,801,392 B2 | 10/2004 | Kawasaki et al. | |
| 7,061,726 B2 * | 6/2006 | Ohtomo et al. ................ | 360/319 |
| 7,082,016 B2 * | 7/2006 | Pust et al. ....................... | 360/319 |
| 2002/0064002 A1 * | 5/2002 | Gill ................................ | 360/319 |
| 2004/0012894 A1 * | 1/2004 | Pust et al. ....................... | 360/319 |
| 2004/0223265 A1 * | 11/2004 | Ohtomo et al. ................ | 360/317 |
| 2005/0157431 A1 * | 7/2005 | Hatatani et al. ................ | 360/319 |
| 2007/0195467 A1 * | 8/2007 | Gill ................................ | 360/319 |

FOREIGN PATENT DOCUMENTS

JP 2004-334995 11/2004

* cited by examiner

*Primary Examiner* — David D Davis
(74) *Attorney, Agent, or Firm* — Zilka-Kotab, PC

(57) ABSTRACT

Embodiments in accordance with the present invention provide a magnetic head of the CPP structure for perpendicular magnetic recording, that is excellent in read performance, and stable in write/read performances by enhancing the external field durability, and further, suppresses deterioration in read sensor property, due to thermal factors. At least either shield layer of a lower magnetic shield layer, and an upper magnetic shield layer, closer to a perpendicular magnetic write head, is made up so as to have a multi-layered structure comprising low thermal expansion nonmagnetic layers, and magnetic layers. Material having a coefficient of thermal expansion smaller than that of a magnetoresistive film is selected as a material for the low thermal expansion nonmagnetic layers of the shield layer.

22 Claims, 12 Drawing Sheets

MAGNETIC HEAD HAVING SHIELD LAYER(S) WITH LOW COEFFICIENT OF THERMAL EXPANSION AND MAGNETIC STORAGE APPARATUS HAVING SAME

CROSS-REFERENCES TO RELATED APPLICATIONS

The instant nonprovisional patent application claims priority to the following applications, each of which is incorporated by reference in its entirety herein for all purposes: Japanese Patent Application No. 2006-147893 filed May 29, 2006; and Japanese Patent Application No. 2006-307359 filed Nov. 14, 2006.

BACKGROUND OF THE INVENTION

As progress in higher performance of a computer is made, further reduction in size, and increase in capacity are being required of the hard disk drive that is the main storage unit thereof. To cope with such requirements, it is desirable to enhance recording density. With conventional longitudinal magnetic recording, however, a recording medium has portions where the recording bits adjacent to each other have opposite magnetizations for carrying written information, so that if a bit length is shortened, a magnetization state is turned unstable, causing a problem of thermal stability, that is, difficulty with holding information for a long time. There is a perpendicular magnetic recording as one of means for circumventing this problem. With perpendicular magnetic recording, magnetization for carrying information is oriented in the direction of thickness of a recording medium, so that a magnetic field generated from a recording bit acts in such a direction as to stabilize magnetization in an adjacent recording bit, and consequently, the problem of the thermal instability hardly occurs.

One problem with a write head for perpendicular magnetic recording is a possibility that when an external field acts thereon, magnetic material disposed inside the head will behave like an antenna to cause the external field to converge thereto, thereby writing unnecessary information to a recording medium, and resulting in erasure of necessary information. In order to reduce such an adverse effect of the external field, and to enhance the external field durability, there is the need for improvement on not only a main pole and a return pole as constituents of a write head, but also shield layers as constituents of a read head.

For the head for the perpendicular magnetic recording to achieve a still higher recording density, a head of a CPP (current perpendicular to the plane) structure where a sensing current is caused to flow so as to penetrate through multi-layer interfaces of a sensor film is preferably used as a read head. That is, in comparison with a conventional head of a CIP (current into the plane) structure where a sensing current is caused to flow in the in-plane direction of a sensor film, the head of the CPP structure has following advantages over the conventional head of the CIP structure.

(1) As there is no need for securing insulation between the sensor film and a lower shield or an upper shield, it is possible to dispense with an insulating layer that is indispensable for the head of the CIP structure, so that a distance between the lower shield and the upper shield (a shield-to-shield distance) can be rendered narrower.

(2) With the head of the CIP structure, the sensor film is provided with a thick electrode on respective sides thereof so as to allow the sensing current to flow in the in-plane direction of the sensor film, thereby causing a shield-to-shield distance on both sides of the sensor film to become wider. As a result, a shielding effect in a cross-track width direction is lessened, thereby leading to occurrence of a problem of side reading, causing signals in wider range to be read. In contrast, with the head of the CPP structure, since electrodes on both sides of the sensor film is unnecessary, a narrow shield-to-shield distance can be maintained even on both sides of the sensor film, and as a result, it is possible to achieve a narrower magnetic track width.

However, there is a demerit due to adoption of the CPP structure for the head. The demerit is related to description given in item (1) as above. More specifically, because above and below the sensor film of the head of the CIP structure, there is disposed an alumina insulating layer higher in hardness, and smaller in a coefficient of thermal expansion in comparison with a common metal, even in case that any distortion occurs to the shield layers that are large in volume within a read head, effects of the distortion on the sensor film are relieved by the alumina insulating layer. On the other hand, since the sensor film of the head of the CPP structure is in direct contact with the shield layers or in contact therewith through a metal layer provided for adjustment of the shield-to-shield distance, the sensor film is susceptible to the effects of distortion occurring to the shield layers. In JP-A No. 2004-334995, there has been disclosed a technology for using a shield small in thermal distortion, in other words, small in thermal expansion, for a shield layer of a head of the CPP structure.

In order to cope with requirements for a higher recording density, it is essential to combine the write head for perpendicular magnetic recording with the read head of the CPP structure. In JP-A No. 2004-334995, use of a low thermal expansion non-magnetic material having a coefficient of thermal expansion not greater than $11.5 \times 10^{-6}$ ($/°$ K) for at least either of a lower magnetic shield layer and an upper magnetic shield layer has been disclosed as a technology for curbing one of problems with the head of the CPP structure, that is, the effects of the distortion occurring to the shield layers. In this case, however, a countermeasure against the external field durability, posing a problem when the read head of the CPP structure is combined with the write head for perpendicular magnetic recording, has not been taken into consideration.

BRIEF SUMMARY OF THE INVENTION

Embodiments in accordance with the present invention provide a magnetic head of the CPP structure for perpendicular magnetic recording, excellent in read performance, and stable in write/read performances by enhancing the external field durability, and further, suppressing deterioration in read sensor property, due to thermal factors. As shown in the specific embodiment of FIG. 7(B), at least either shield layer of a lower magnetic shield layer 1, and an upper magnetic shield layer 21, closer to a perpendicular magnetic write head, is made up so as to have a multi-layered structure comprising low thermal expansion nonmagnetic layers 212, and magnetic layers 211. Material having a coefficient of thermal expansion smaller than that of a magnetoresistive film is selected as a material for the low thermal expansion nonmagnetic layers of the shield layer.

BRIEF DESCRIPTION OF THE DRAWINGS

FIG. 7 is a schematic view broadly showing a magnetic sensor portion of a magnetoresistive head of the CPP structure, according to the invention, in which FIG. 7(A) is a view showing a structure of an air bearing surface thereof, along a track width direction, and FIG. 7(B) is a view showing a sectional structure thereof, in the direction of a sensor height.

FIG. 10 is a schematic view broadly showing a sectional structure of a magnetic sensor portion of a further magnetoresistive head of the CPP structure, according to the invention, in the direction of a sensor height.

DETAILED DESCRIPTION OF THE INVENTION

Embodiments in accordance with the present invention relate to a magnetic head for perpendicular magnetic recording, used in writing and reading information by adopting perpendicular magnetic recording.

It is an object of embodiments in accordance with the present invention to provide a magnetic head of a CPP structure for perpendicular magnetic recording, excellent in read characteristic, and having stable recording and reading performance by enhancing the external field durability, posing a problem when a read head of the CPP structure is combined with a write head for perpendicular magnetic recording, and by curbing deterioration in performance of a read sensor, due to distortion of shield layers, particularly caused thermal factors.

This object of embodiments in accordance with the present invention is attained if at least either shield layer of an upper magnetic shield layer, and a lower magnetic shield layer with a magnetoresistive film sandwiched therebetween, disposed closer to the write head for perpendicular magnetic recording, is made up so as to have a multi-layered structure made of a low thermal expansion non-magnetic material having a coefficient of thermal expansion smaller than that of the magnetoresistive film. Further, if a gap layer is disposed between either the shield layer of the upper magnetic shield layer and the lower magnetic shield layer, and the magnetoresistive film, a higher advantageous effect can be obtained by causing the gap layer to have a coefficient of thermal expansion equivalent to, or smaller than that of the magnetoresistive film.

In accordance with one aspect of embodiments in accordance with the present invention, there is provided a magnetic head of the CPP structure for perpendicular magnetic recording including a write system having high external field durability, capable of curbing erroneous writing to a recording medium, or erroneous erasure of information, and a read system excellent in thermal stability and read performance, capable of curbing distortion of the shield layer, particularly adverse effects thereon, due to thermal factors.

An embodiment of the invention is described hereinafter with reference to the accompanying drawings.

Figure 1:
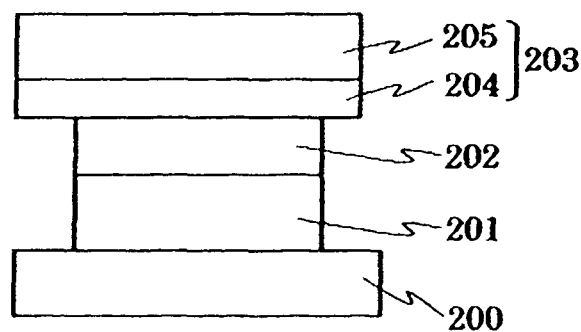
FIG. 1 is a schematic view broadly showing a structure of a sample used for evaluation on thermal stability of a CPP structure sensor.

Results of studies conducted on a structure and thermal stability of a CPP structure sensor are described hereinafter. FIG. 1 broadly shows a structure of a sample used for evaluation. A stacked layer made of a Ni—Fe—Cr alloy layer (4.5 nm) and a Cu layer (100 nm), as a lower electrode 200, was provided on a substrate, and on the top of the lower electrode 200, a CPP sensor film 201 of a spin-valve structure, and a protection film 202 (corresponding to a gap layer in a read head) were formed to be patterned to a predetermined size. Thereafter, an upper electrode 203 was formed. In this case, for the CPP sensor film, use was made of a confined current path type CPP-GMR film comprising a seed layer made of Ta (3 nm) / a Ni—Fe base alloy (2 nm), an antiferromagnetic layer made of a Pt—Mn base alloy (15 nm), a pinned layer made of a Co—Fe base alloy (3 nm)/Ru (0.4 nm)/a Co—Fe base alloy (3 nm), an intermediate layer made up of a Cu-base alloy layer (3 nm) provided with a confined current path layer, and a free layer made of the Ni—Fe base alloy (1 nm)/the Co—Fe base alloy (2 nm), sequentially formed from a side of the substrate. A permalloy, whose Ni content is 75 atomic percent or more and 85 atomic percent or less, was used as the Ni—Fe alloy in the free layer. The Co—Fe alloy in the free layer has a Co content which is 70 atomic percent or more and 100 atomic percent or less.

Figure 2:
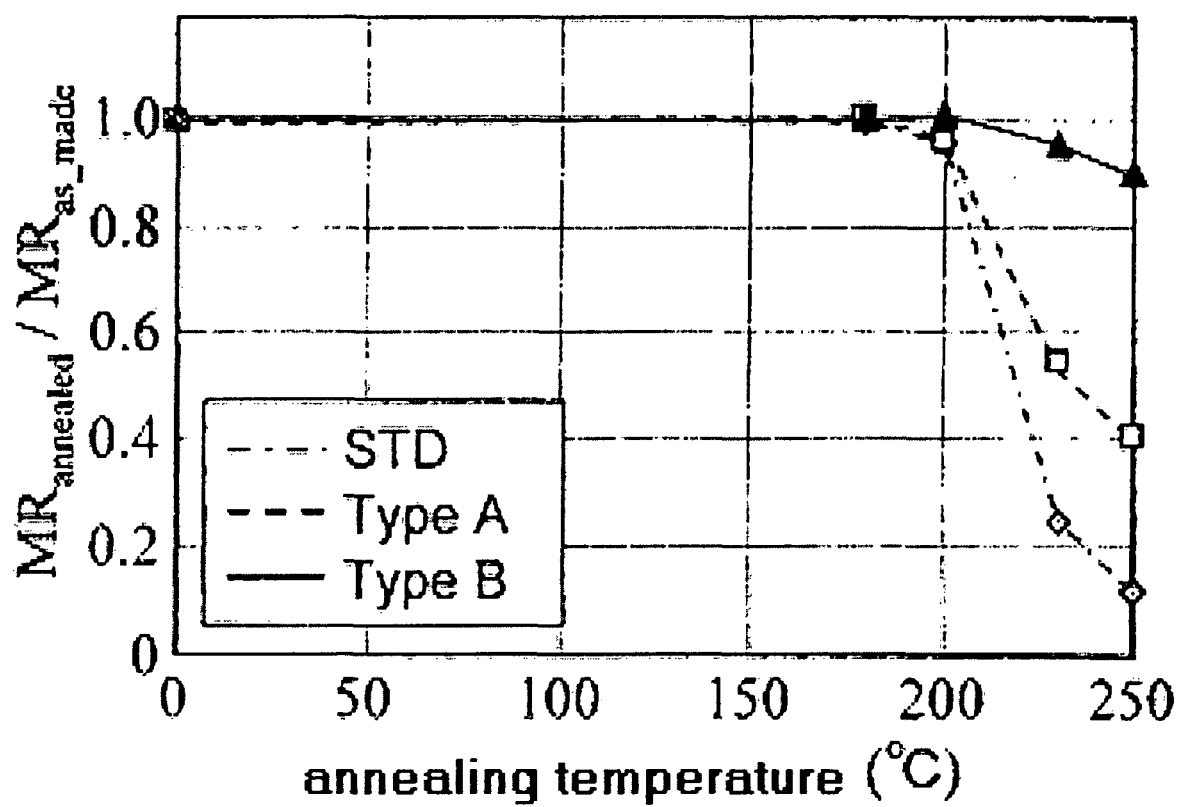
FIG. 2 is a graph showing thermal stability of a confined current path type CPP-GMR film.

FIG. 2 shows results of investigations conducted on thermal stability by varying constitution of the protection film as well as the upper electrode. Herein, symbol STD represents a case where the protection film was made up of a Cu layer (5 nm)/Ru layer (10 nm), sequentially formed from a side of the substrate, and the upper electrode included only a first upper electrode layer 204 (without a second upper electrode layer 205) made up of a Ta layer (2 nm)/an Au layer (200 nm)/a Ta layer (5 nm), and symbol Type A represents a case where the upper electrode was the same as with the case of STD, but the constitution of the protection film was varied to be made up of a Cu layer (2 nm)/Ta layer (7 nm)/Ru layer (4 nm)/Ta layer (2 nm). Further, symbol Type B represents a case where the constitution of the protection film was the same as with the case of Type A, and the first upper electrode 204 was made up of a Ta layer (5 nm)/an 80 atomic percent Ni-20 atomic percent Fe alloy layer (15 nm) while the second upper electrode 205 was made up of a Ta layer (2 nm)/Au layer (200 nm)/Ta layer (5 nm). Annealing was applied to the samples for three hours at an annealing temperature in a range of 180 to 250° C., whereupon a value obtained by normalizing a magnetoresistive ratio after the annealing with that before the annealing was adopted as an index for thermal stability.

As shown in FIG. 2, in contrast to the case of STD, where a MR ratio abruptly drops at an annealing temperature of 200° C. or higher, in the case of Type A, where the constitution of the protection film was varied, a MR ratio also abruptly drops at the annealing temperature of 200° C. or higher, but deterioration is found smaller in magnitude. In the case of Type B, where the constitution of the upper electrode was varied, a MR ratio even at 250° C. is found maintaining 90% of a MR ratio obtained prior to the annealing, thus demonstrating that the thermal stability in this case is most excellent.

Now, a cause for improvement on the thermal stability is contemplated hereinafter in association with coefficient of linear expansion. The STD case differs from the Type A case only in respect of the constitution of the protection film, and the protection film in the former case is made of Cu/Ru while the same in the latter case is made of Cu/Ta/Ru/Ta. When comparing coefficient of linear expansion of Cu with that of Ta in view of the respective constitutions of those protection films, it is found that the coefficient of linear expansion of Cu is $16.5 \times 10^{-6}$ (/° C.), and the coefficient of linear expansion of Ta is $6.5 \times 10^{-6}$ (/° C.), smaller than the former. Further, the Type A case differs from the Type B case in respect of the constitution of the first upper electrode layer 204 in contact with the CPP element such that the former case includes Au while the latter case includes the 80 atomic percent Ni-20 atomic percent Fe alloy. The respective coefficients of linear expansion of those constituents are Au: $14.2 \times 10^{-6}$ (/° C.), and the 80 atomic percent Ni-20 atomic percent Fe alloy: $13.3 \times 10^{-6}$ (/° C.), the latter being smaller than the former.

It is presumed from the above that owing to a difference in thermal expansion between the upper electrode and the CPP element, magnitude of expansion due to the annealing differs in degree from each other, and such difference in expansion, as stress, acted on the CPP element, thereby having caused deterioration in the MR ratio. Accordingly, it is believed that use of material low in coefficient of linear expansion for the protection film, and the upper electrode will enable a magnetic head high in thermal stability to be obtained. With an actual read head, the protection film corresponds to a gap layer, and the upper electrode corresponds to an upper magnetic shield layer.

Figure 3:
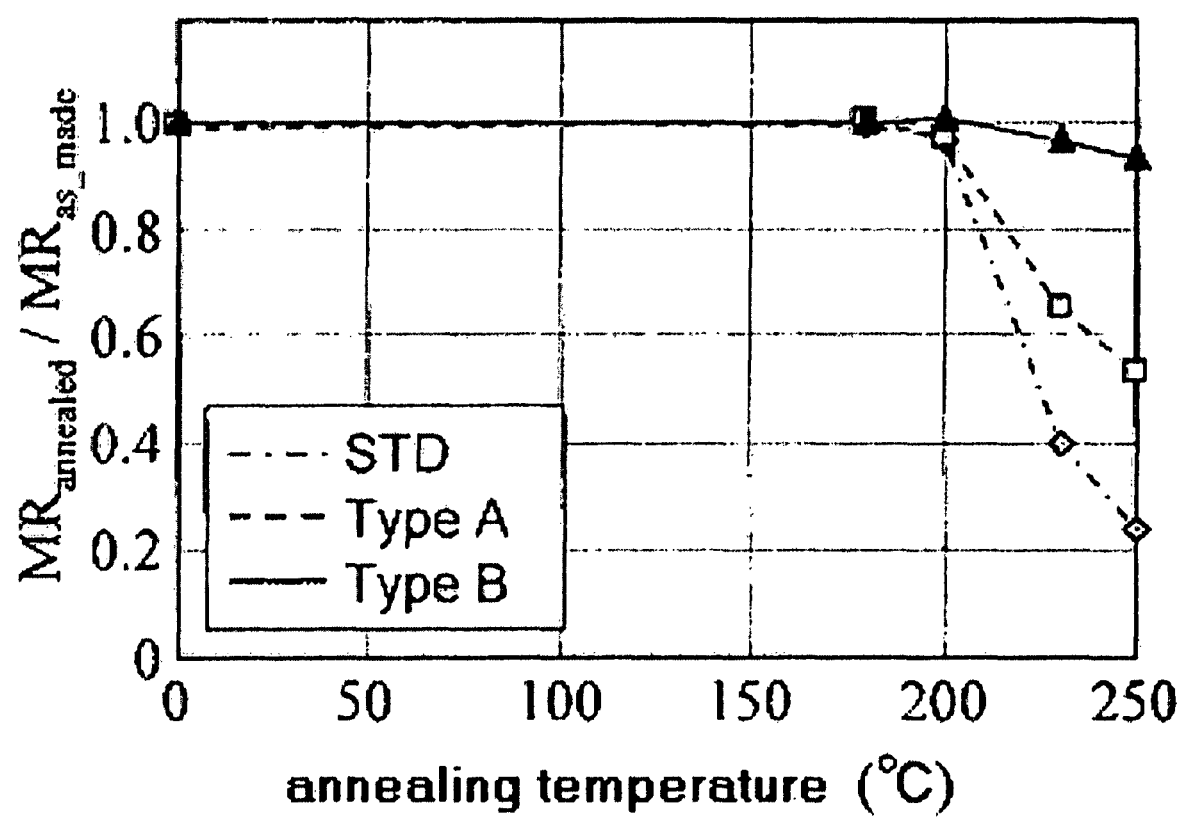
FIG. 3 is a graph showing thermal stability of a TMR film.
Figure 4:
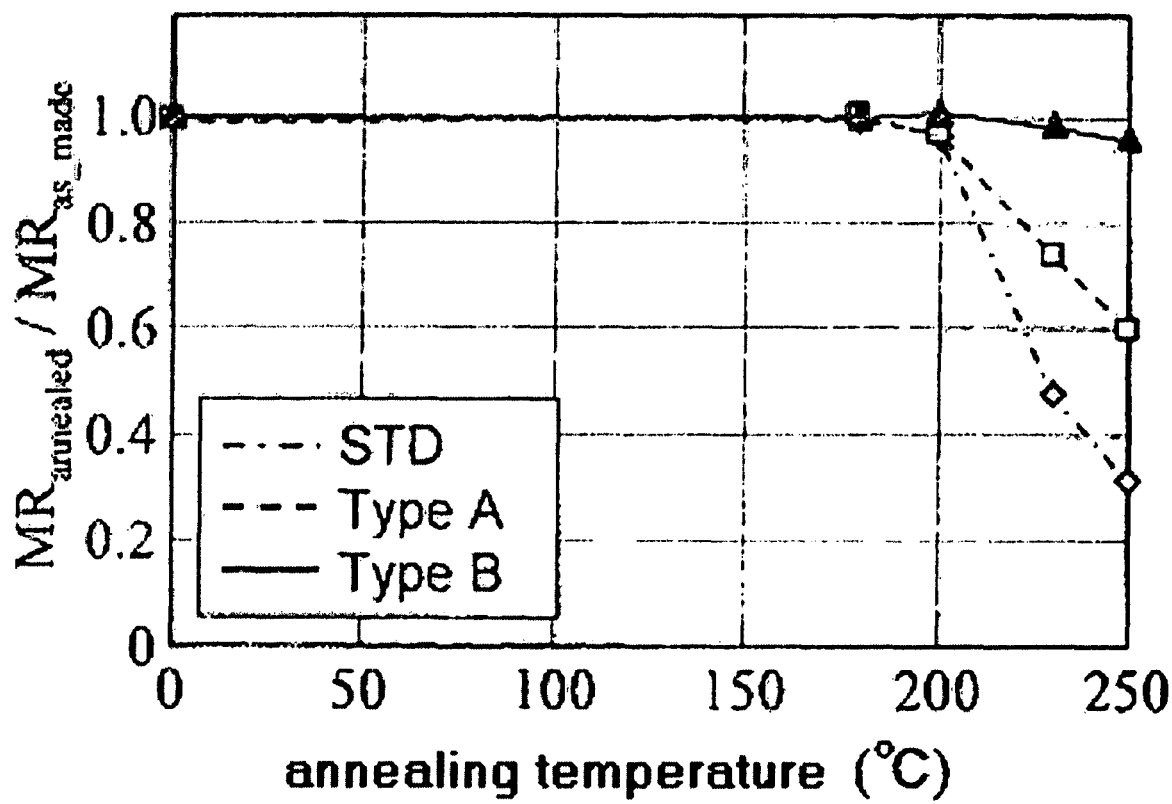
FIG. 4 is a graph showing thermal stability of a CPP-GMR film comprising an intermediate layer made of a metal only.

FIG. 3 is a view showing results of similar investigations conducted by substituting a tunneling magnetoresistive (TMR) film for the CPP sensor film. FIG. 4 is a view showing results of similar investigations conducted by using a CPP-GMR film comprising an intermediate layer made of a metal only without a confined current path layer provided therein. More specifically, the constitution of the film, except for the intermediate layer, is the same as the former, and in the former case, an alumina layer (0.5 nm) was adopted for the intermediate layer while in the latter case, a Cu layer (3 nm) was adopted for the intermediate layer. It is evident from these figures that similar change occurred to the thermal stability when the constitution of the protection film, and the constitution of the upper electrode are varied although there was difference in magnitude of change among types of the CPP sensor film such that in terms of the magnitude of the deterioration against the annealing temperature, the CPP-GMR film comprising the intermediate layer made of only Cu underwent the least deterioration, followed by the TMR film, and the CPP-GMR film comprising the intermediate layer provided with the confined current path layer underwent the largest deterioration. Further, when material and film-thickness were varied with respect to the seed layer, antiferromagnetic layer, pinned layer, and free layer, similar phenomena were observed although magnitude of deterioration somewhat differed on a case-by-case basis. Thus, enhancement in thermal stability due to the adoption of material low in a coefficient of thermal expansion for the protection film, and the upper electrode represents a phenomenon common to the CPP structure sensors.

The following describes a probable reason why thermal stability was improved in a CPP sensor with any structure regardless of different intermediate layers. It may be considered that among layers forming a CPP sensor, a layer easily influenced by heat is not an intermediate layer, but a common layer other than the intermediate layer. Among the common layers, (1) a magnetoresistive effect does not occur in a seed layer or an antiferromagnetic layer, but occurs in a pinned layer and a free layer that are made of a ferromagnetic material, and further (2) the magnetization of the pinned layer is pinned by the antiferromagnetic layer. Owing to (1) and (2) above, even when thermal expansion occurs, it is difficult to consider that the magnetic property and the spin transport property drastically change. Therefore, the thermal expansion coefficient of the free layer must mainly be considered. Generally, a material made of Fe, Co, or Ni, or typically, 75 to 85 at. % Ni-25 to 15 at. % Fe alloy, or 70 to 100 at. % Co-30 to 0 at. % Fe based alloy is used as a free layer. To obtain good soft magnetic property, the thickness of the former is often increased. There is no remarkable difference between respective thermal expansion coefficients: approx. $13.3 \times 10^{-6}$ and approx. $13.0 \times 10^{-6}$. 75 to 85 at. % Ni-25 to 15 at. % Fe alloy may therefore be considered to be a representative value of the thermal expansion coefficient for a free layer.

Next, enhancement in durability of a write head for perpendicular magnetic recording to the external field is described. Erroneous writing or erroneous erasure by the shield layer of a read head is basically attributable to a fact that a stray field such as a magnetic field from a voice coil motor inside a hard disk drive, and a magnetic field generated from coils for writing are converged by the shield layer. As a countermeasure against this problem, lowering of a stripe height of the shield can be cited from the viewpoint of lessening the antenna effect of the shield, however, it is not necessarily a fully satisfactory countermeasure, and its effect is regarded small from the viewpoint of reducing the magnetic field generated from the coils for writing.

Figure 5:
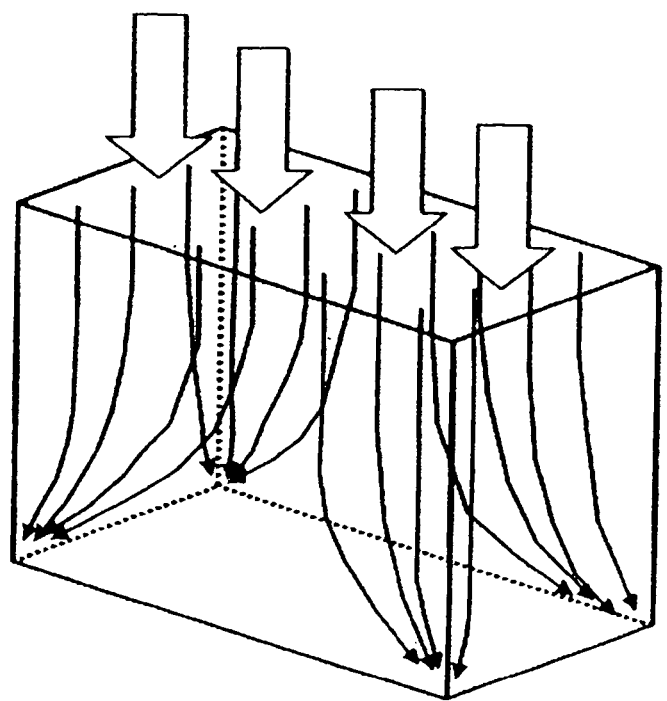
FIG. 5 is a schematic diagram illustrating convergence of magnetic fluxes, occurring in a shield layer made up of only a single-layer, or magnetic material.

Those problems can be solved by adoption of a multi-layered shield. In the case of a shield layer made up of only a single-layer, or magnetic materials, there is a possibility that magnetic fluxes entering a shield undergo localized convergence at corners on the air bearing surface, as shown in FIG. 5, and respective magnetic fields generated therefrom cause writing to occur to the recording medium.

Figure 6:
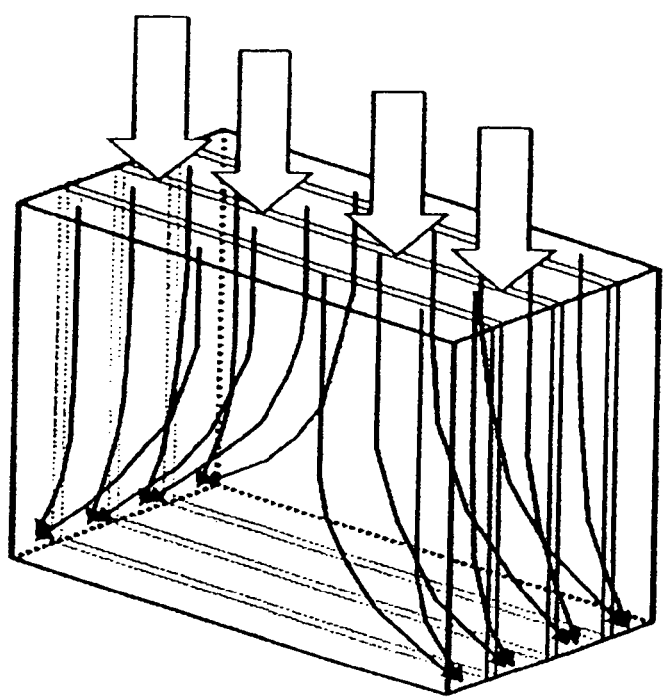
FIG. 6 is a schematic diagram illustrating division and dispersion of magnetic fluxes, occurring in a shield layer where a magnetic layer is divided by respective nonmagnetic layers.

On the other hand, in the case of a shield layer where a magnetic layer is divided by respective nonmagnetic layers as shown in FIG. 6, since magnetic fluxes preferentially flow through a magnetic material, the magnetic fluxes are divided and dispersed inside the shield, and do not undergo localized convergence at corners on the air bearing surface, so that erroneous writing to the recording medium can be prevented.

It may be desirable to adopt a shield layer of a multi-layer structure, made of a non-magnetic material low in a coefficient of thermal expansion, and a magnetic material, as a shield layer of a read head of the CPP structure in order to fulfill both enhancement in thermal stability of the CPP structure sensor, and enhancement in durability of a head for the perpendicular magnetic recording to the external field, as described in the foregoing, and a head has been manufactured to confirm advantageous effects thereof. Sandwiching a non-magnetic material layer between magnetic layers can divide and disperse magnetic flux within a shield, and making the non-magnetic material layer with a low thermal expansion material can suppress the expansion of the whole shield layer and can diminish the difference in a coefficient of thermal expansion between the shield layer and the sensor film.

A specific structure of the head as manufactured is described hereinafter with reference to the accompanying drawings.

Embodiment 1

Figure 7:
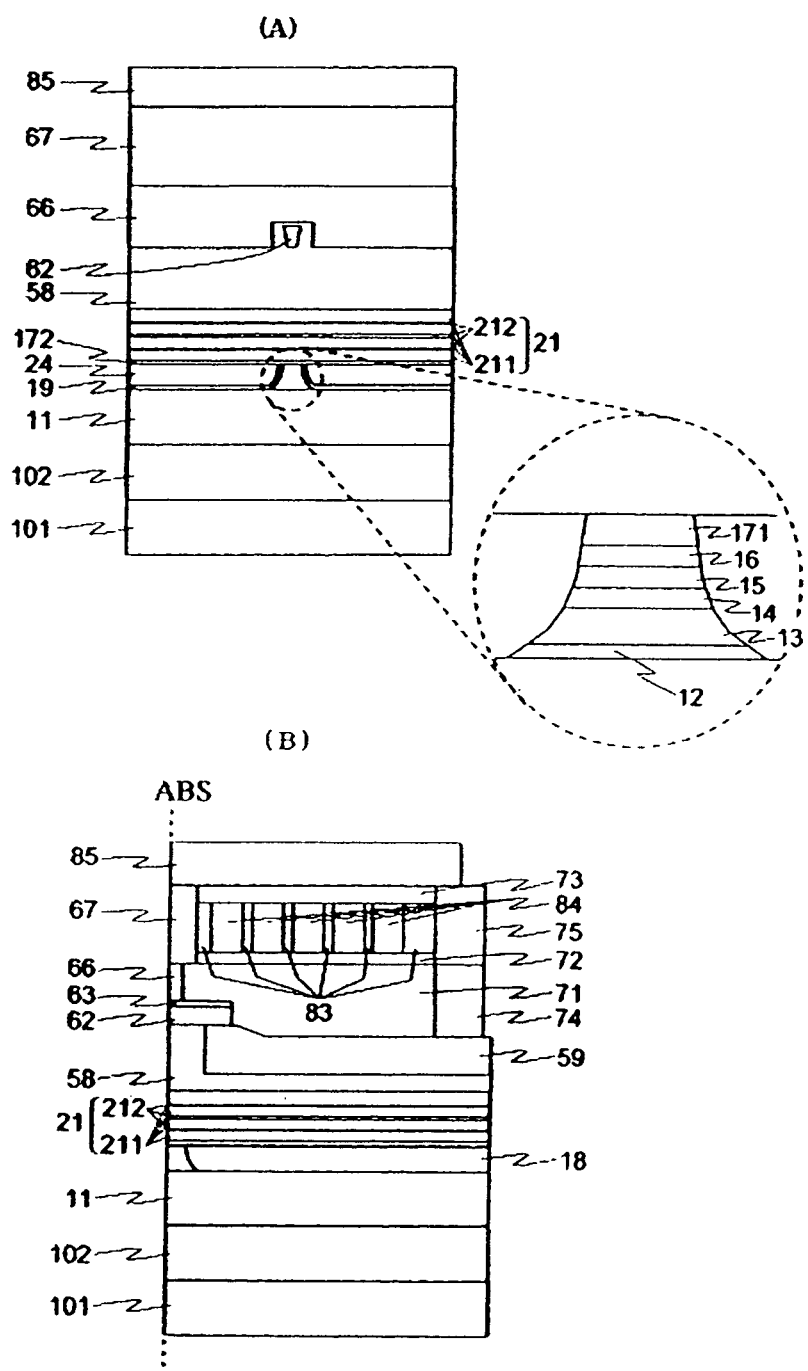

FIG. 7 is a schematic view broadly showing Embodiment 1 of a head of the CPP structure for perpendicular magnetic recording, according to an embodiment of the present invention. FIG. 7(A) is a view showing a structure of an air bearing surface thereof, along a track width direction, and FIG. 7(B) is a view showing a sectional structure thereof, in the direction of a sensor height.

The top of a substrate 101 made up of a ceramic containing alumina, and titanium carbide is coated with an insulating film 102 made of alumina, and so forth, and after planarization of the surface of the insulating film 102 by fine polishing, a lower magnetic shield layer 11 made of an Ni—Fe base alloy, and so forth is formed thereon. More specifically, after a lower magnetic shield film formed by, for example, the sputtering, ion beam sputtering, or plating method is patterned into a predetermined shape, the insulating film made of alumina, and so forth is formed across the substrate, and is subsequently planarized by chemical mechanical polishing so as to be substantially flat in height with an insulating film provided on the periphery thereof. At this point in time, surface roughnesses of the lower magnetic shield layer 11 are controlled in magnitude so as to be less than a predetermined magnitude.

After cleaning the top surface oxide film, and so forth in a deposition apparatus, a lower gap layer 12, an antiferromagnetic layer 13, a pinned layer 14, an intermediate layer 15, a free layer 16, and a first protection layer 171 are formed in that order from a side of the substrate, so as to serve as a magnetoresistive film making up a sensor portion. In this case, for the lower gap layer 12 doubling as a shield layer, use was made of Ta (3 nm)/Ni—Fe base alloy (2 nm). For the magnetoresistive film, use was made of the confined current path type CPP-GMR film; for the antiferromagnetic layer 13, use was made of the Pt—Mn base alloy (15 nm), for the pinned layer 14, use was made of the Co—Fe base alloy (3 nm)/Ru (0.4 nm)/Co—Fe base alloy (3 nm), for the intermediate layer 15, use was made up of the Cu-base alloy layer (3 nm) provided with a confined current path layer, for the free layer 16, use was made of the Ni—Fe base alloy (1 nm)/Co—Fe base alloy (2 nm). And the first protection layer 171 of Cu (2 nm) was provided thereon. Thereafter, annealing within a magnetic field is applied as necessary in order to cause magnetization of the pinned layer to be oriented in a specified direction.

In this particular embodiment, as the antiferromagnetic layer 13 is formed of an order phase Pt—Mn base antiferromagnetic material, annealing within a magnetic field is preferably applied until an ordered structure is formed, and magnetic exchange coupling with the pinned layer occurs. A permalloy, whose Ni content is 75 atomic percent or more and 85 atomic percent or less, was used as the Ni—Fe alloy in the free layer. The Co—Fe alloy in the free layer has a Co content which is 70 atomic percent or more and 100 atomic percent or less. The thermal expansion coefficient of the sensor film depends on the free layer having the highest coefficient of thermal expansion.

Next, a lift-off mask is formed in a region corresponding to the sensor portion, in the direction of the sensor height, and after unnecessary portions of the magnetoresistive film, and so froth are removed by etching, a refill film 18 in the direction of the sensor height is formed by, for example, the sputtering, ion beam sputtering, or CVD method. For the refill film 18 formed in the direction of the sensor height, use can be made of a single-layer film made of alumina, silicon oxide, tantalum oxide, aluminum nitride, silicon nitride, tantalum nitride, or the like, a composite film thereof, or a stacked film thereof. In the case of using the stacked film, if the oxide film or the nitride film is disposed as the bottom layer on a side of the substrate, a metal film can be used in the uppermost layer close to an upper magnetic shield layer, in which case, at least the oxide film or the nitride film in the bottom layer is preferably larger in thickness than the metal film in the uppermost layer from a standpoint of reducing electrostatic capacity created between the lower magnetic shield layer, and the upper magnetic shield layer. After the formation of the refill film 18 in the direction of the sensor height by the method described, the lift-off mask is removed.

After completion of the structure of the head, in the direction of the sensor height, a lift-off mask is formed in a region corresponding to the sensor portion, in a track width direction, and portions of the magnetoresistive film, other than a portion thereof, corresponding to a sensor for detection of magnetic fields, are removed by etching. As with the structure of the head, in the direction of the sensor height, it is important not to leave out re-deposited material at respective edges of the magnetoresistive film at this point in time. Thereafter, there is formed a track-direction insulating film 19 made up of a single-layer film of alumina, silicon oxide, tantalum oxide, aluminum nitride, silicon nitride, tantalum nitride, or the like, a composite film thereof, or a stacked film thereof, and further, a longitudinal biasing layer 24 for applying longitudinal biasing to the free layer 16 is formed over the track width direction insulating film 19. Subsequently, the lift-off mask is removed, thereby completing processing in a track width direction. At this point in time, a seed layer may be provided in order to control the characteristic of a hard magnetic film, that is, coercivity thereof, in particular, and a capping layer may be provided over the hard magnetic film for the purpose of protection during processing.

When forming the structure of the head, in the direction of the sensor height, and the structure of the head, in the track width direction, etching of the magnetoresistive film can be carried out by the ion beam etching method, a reactive ion beam etching method, and so forth. In those methods, control of the end point of the etching can be controlled by etching time on the basis of an etching rate; however, control with higher precision can be implemented by monitoring etched elements during the etching with the use of the secondary ion mass spectrometry, or the plasma emission spectroscopy method, and so forth.

Next, there is formed a lead for feeding a sensing current to the lower magnetic shield layer 11, and the upper magnetic shield layer 21, respectively. As a constituent material of the lead, use is made of a low resistive metal such as Cu, Au, Ta, Rh, Mo, and so forth, and another metal layer may be provided on the upper side, lower side, or both sides of the lead, as necessary.

After forming an insulating protection film as necessary, the top surfaces of the magnetoresistive film, the leads, and so forth are cleaned, and subsequently, a second upper gap layer 172 doubling as a seed layer of the upper magnetic shield layer 21, and the upper magnetic shield layer 21 are formed. In this case, for the upper magnetic shield layer 21, use was made of a multi-layered structure made up of magnetic layers 211 made of the 80 atomic percent Ni-20 atomic percent Fe alloy, 200 nm thick, respectively, and low thermal expansion nonmagnetic layers 212 made of Zr, 50 nm thick, respectively. While the former has a coefficient of thermal expansion at $13.3 \times 10^{-6}$ (/° C.), the latter has a coefficient of thermal expansion at $5.0 \times 10^{-6}$ (/° C.), equivalent in value to on the order of about ½.5 of the coefficient of thermal expansion of the former.

In FIGS. 7(A), 7(B), there are shown the multi-layered structure made up of the magnetic layers 211 in four layers, and the low thermal expansion nonmagnetic layers 212 in three layers, however, since those numbers are given by way of example, the numbers of the respective layers may be less than, or more than those as described as long as the magnetic layers 211 are isolated from each other by the low thermal expansion nonmagnetic layer 212. In this connection, from the viewpoint of enhancement in the external field durability, the greater the number of the magnetic layers 211, the higher an advantageous effective of such a constitution will become because magnetic fluxes entering the respective shield layers will branch off to thereby render localized convergence less likely to occur provided that the shield layer remain the same in thickness. However, if the number of the magnetic layers 211 is increased, and the respective magnetic layers 211 become smaller in thickness, the soft magnetic property required of the shield layers comes to be impaired.

Figure 11:
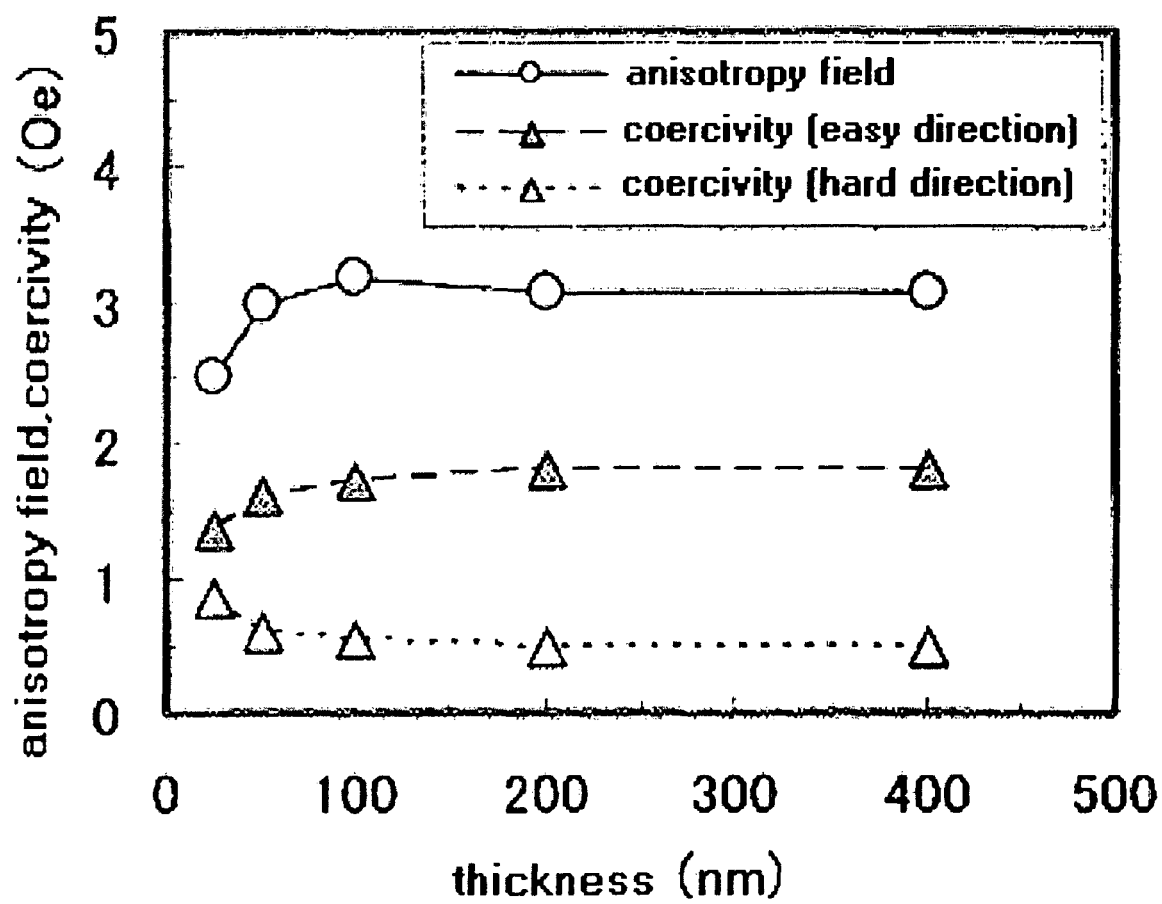
FIG. 11 is a view showing dependence of the magnetic property of an 80 atomic percent Ni-20 atomic percent Fe alloy, on film-thickness.

FIG. 11 is a view showing dependence of the magnetic property of the 80 atomic percent Ni-20 atomic percent Fe alloy, as a typical soft magnetic material, on film-thickness, in the case where the alloy is produced by the plating method. In the figure, it is shown that an anisotropy field, coercivity along an easy direction, and coercivity along a hard direction hardly underwent a change even if the film thickness is decreased from 400 nm down to 50 nm, however, with the film thickness at 25 nm, both the anisotropy field, and the coercivity along an easy direction decreased while the coercivity along a hard direction increased. Such changes indicate that the direction of magnetization inside the magnetic layer has started dispersion at 25 nm in film-thickness, which suggests deterioration in permeability as the important property of the shield layer. Hence, the magnetic layers 211 each are preferably not less than 50 nm in film-thickness.

Thus, fabrication of the read head of the CPP structure is completed.

Over the read head of the CPP structure, there is formed an insulative separator 58 for isolating the read head of the CPP structure from the write head for perpendicular magnetic recording, and over the insulative separator 58, a yoke 59 made of, for example, an Ni—Fe alloy is formed by plating to be then coated with alumina before subjected to planarization by the chemical mechanical polishing (CMP) method. Further, by causing a magnetic material making up the yoke 59 to undergo negative magnetostriction, it is possible to stabilize a magnetic domain structure in the track width direction, thereby suppressing possible erasure caused by remnant magnetization of pole, which is a problem unique to the write head for perpendicular magnetic recording. Over the yoke 59 as planarized, a main pole 62 is first formed by ion milling. As the main pole 62 is formed directly above the upper magnetic shield layer 21 through the insulative separator 58, it is possible to shorten a distance between the free layer 16 in the magnetoresistive film, and the main pole 62, thereby enhancing format efficiency.

Next, an alumina film to serve as a gap film is formed over the main pole 62, and after a write gap 63 is formed by ion milling, a seed layer for plating is formed, whereupon a first wrap around shield 66, and a first back contact 74 are concurrently formed in the direction of the thickness of the main pole by frame plating, and further, after formation of a planarization film 71 made of alumina, and so forth, a second wrap around shield 67, and a second back contact 75 are concurrently formed by plating and so forth. For the first wrap around shield 66, and the second wrap around shield 67, use is typically made of the 80 atomic percent Ni-20 atomic percent Fe alloy, however, use may be alternatively made of, for example, an Ni—Fe alloy of other composition, a Fe—Co alloy, a Fe—Co—Ni alloy, and so forth, and a method of forming the same may be sputtering other than plating. Herein, the first wrap around shield 66, and the second wrap around shield 67 are provided in order to render a magnetic field gradient of the write field generated from the main pole 62 steeper to thereby enable writing to be executed with a small magnetization transition length, so that those elements are not necessarily required depending on the performance of the write head for perpendicular magnetic recording in combination with the performance of a perpendicular magnetic recording medium.

After the formation of the second wrap around shield 67, a first coil insulating layer 72 for insulating coils from the shield is formed, and subsequently, there are stacked coils 84, resist insulating layers 83 for insulating between the coils, and a second coil insulating layer 73 in that order. At the time of forming the resist insulating layers 83, annealing is applied to cure a resist, and at this point in time, annealing may be applied while applying the external field, as necessary, in order to control directions of magnetization of the pinned layer 14, and the free layer 16, respectively.

Over the second coil insulating layer 73, a return pole 85 is formed so as to be magnetically coupled to the second wrap around shield 67, and further, contact pads and protection alumina layer are formed, thereby completing a wafer process for the magnetic head of the CPP structure for perpendicular magnetic recording.

After completion of the wafer process, further process steps are taken such as a lapping step for grinding elements of the magnetic head of the CPP structure for perpendicular magnetic recording by mechanical lapping to desired heights of the elements, respectively, a step for forming a protection film for protection of the air bearing surface of the read head of the CPP structure, and a write head for perpendicular magnetic recording, respectively, a step for forming a predetermined rail shape on the air bearing surfaces of the magnetic heads to control a distance (spacing) between the respective magnetic heads, and the magnetic recording medium, and an assembling step for bonding the individual magnetic heads to suspensions, thereby completing a head gimbal assembly.

For the sake of comparison, there was also fabricated a magnetic head of the CPP structure, for perpendicular magnetic recording, having the same structure as described in the foregoing except for the upper magnetic shield layer 21, wherein the upper magnetic shield layer 21 was made up of a magnetic layer made of the 80 atomic percent Ni-20 atomic percent Fe alloy only, and evaluation was made on thermal stability of a read head of the CPP structure, and durability of a write head for perpendicular magnetic recording, to the external field. In this case, the thermal stability of the read head of the CPP structure was evaluated by comparing a magnetoresistive property of the read head of the CPP structure after completion of fabrication thereof during the wafer process with that after annealing at 230° C. for three hours for curing the resist insulating layers 83 for insulating between the coils of the write head for perpendicular magnetic recording. If the thermal stability is excellent, a difference between both the magnetoresistive properties becomes small. For evaluation of the durability of the write head for perpendicular magnetic recording, to the external field, a head having a magnetoresistive ratio equivalent to not less than 90% of that prior to the annealing even after the annealing at 230° C. for three hours for curing the resist insulating layers 83 was selected to be mounted in a spin stand, write/read operations were carried out while applying the external field in the direction of the sensor height, and subsequently, the head was moved to a track underneath a location where the edge of the shield layer was positioned to thereby evaluate a readback output. If the durability of the write head for perpendicular magnetic recording to the external field is high, this will have an effect of suppressing writing occurring to the recording medium due to convergence of the magnetic fluxes at the edge of the shield, so that deterioration in readback output, occurring between before and after movement of the head, will be less. As to the thermal stability of the read head of the CPP structure, evaluation was made on 8000 pieces of elements within the wafer, and the elements having a magnetoresistive ratio equivalent to not less than 95% of that prior to the annealing even after the annealing were classified as passed parts. Further, as to the durability of the write head for perpendicular magnetic recording to the external field, evaluation was made on 250 pieces of heads, and the heads each having not less than 95% of readback output obtained before movement of the head after the movement of the head were classified as passed parts.

Table 1 shows respective yields of the head according to embodiments of the present invention, and a comparative example. As shown in Table 1, while a yield of the magnetic head according to the embodiment of the present invention was found at 100% in respect of the thermal stability of the read head of the CPP structure, a yield of the head according to the comparative example was found at 25%. Further, while a yield of the head according to the embodiment of the present invention was found at 90% in respect of the durability of the write head for perpendicular magnetic recording against the external field, a yield of the head according to the comparative example was found at 34%. It was therefore confirmed that the head according to embodiment of the present invention was excellent in respect of the thermal stability as well as the durability against the external field.

TABLE 1

| | Yield (evaluation on thermal stability) | Yield (evaluation on durability to external field) |
|---|---|---|
| Head according to the invention | 100% | 90% |
| Comparative example (conventional head) | 25% | 34% |

With the present embodiment of the invention, for the low thermal expansion nonmagnetic layers 212 of the upper magnetic shield layer 21, use was made of Zr, but it is to be pointed out that use is not limited thereto. A usable constituent material thereof, other than Zr, is material containing at least one element selected from the group consisting of Cr, Si, W, C, Ta, Ti, Nb, Pt, V, Pd, B, Mo, Rh, and Zr, smaller in a coefficient of thermal expansion than the 80 atomic percent Ni-20 atomic percent Fe alloy. In the case of using the upper magnetic shield layer 21 containing Si, C, or B as part of an electrode of the CPP structure sensor, a structure which does not interfere with feeding of the sensing current to the CPP structure sensor is adopted, or resistivity of the magnetic shield layer 21 is adjusted.

Further, with reference to a configuration of magnetic poles, the main pole 62, and the return pole 85 are formed in that order from a side of the upper magnetic shield layer 21, however, even if the configuration of the magnetic poles is reversed, so that the return pole 85 is disposed closer to the upper magnetic shield layer 21, there will be no change in the advantageous effect of the invention.

Regarding dimensions of the lower magnetic shield layer 11, the upper magnetic shield layer 21, and the yoke 59, respectively, the lower magnetic shield layer 11, and the upper magnetic shield layer 21 each are, for example, 80 µm in max. width in the track width direction, and are on the order of 16 µm in max. height in the direction of the sensor height, both being longer in the track width direction while the yoke 59 is rendered not significantly different from the formers in dimensions from the standpoint of the external field durability. Further, with the magnetic head that is required to have a high transfer speed, there is the need for reducing the number of windings of the coils 84, and consequently, it is possible to reduce not only the dimensions of the yoke 59, but also the dimensions of the upper magnetic shield layer 21, and the lower magnetic shield layer 11, respectively.

Embodiment 2

Figure 8:
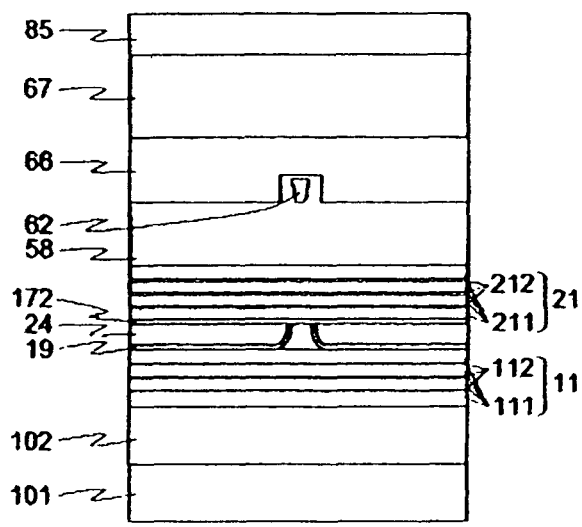
FIG. 8 is a schematic view broadly showing a structure of an air bearing surface of a magnetic sensor portion of another magnetoresistive head of the CPP structure, according to the invention.

FIG. 8 is a view showing Embodiment 2 of a magnetoresistive head of the CPP structure, according to the present invention, in which a structure of an air bearing surface of a magnetic sensor thereof is shown. With this embodiment, for the purpose of obtaining higher thermal stability, there is formed a head wherein for a lower magnetic shield layer 11 as well, use was made of a multi-layered structure made up of magnetic layers 111 made of the 80 atomic percent Ni-20 atomic percent Fe alloy, and low thermal expansion nonmagnetic layers 112 made of Zr, as with an upper magnetic shield layer 21. The magnetoresistive head of the CPP structure, according to the present embodiment, has the same structure as that for Embodiment 1 except for the lower magnetic shield layer 11.

Evaluation on advantageous effects of the present embodiment was made in the same way as was adopted for Embodiment 1, whereupon a yield of the magnetic head according to the present embodiment was held at 100% in respect of the thermal stability, and a yield of the head according to the present embodiment was improved to 92% in respect of the external field durability. However, as a result of detailed examination on the present embodiment in respect of the thermal stability, it was found that a magnetoresistive ratio after the annealing carried out for curing the resist insulating layers 83 for insulating between the coils of the write head deteriorated to 97% of a magnetoresistive ratio before the annealing even with an element having undergone the largest deterioration while, with Embodiment 1, there were found a sprinkling of elements whose magnetoresistive ratio having deteriorated to the order of 95% of the magnetoresistive ratio before the annealing, proving that the present embodiment has an advantageous effect of suppressing thermal distortion of the lower magnetic shield layer 11.

In FIG. 8, it is shown that the lower magnetic shield layer 11 and the upper magnetic shield layer 21, each have a multi-layered structure comprising magnetic layers in four layers, and low thermal expansion nonmagnetic layers in three layers, however, since those are shown simply by way of example, the numbers of the respective layers are not necessarily limited thereto. Further, the lower magnetic shield layer 11 may differ in the numbers of the respective layers from the upper magnetic shield layer 21.

Embodiment 3

Figure 9:
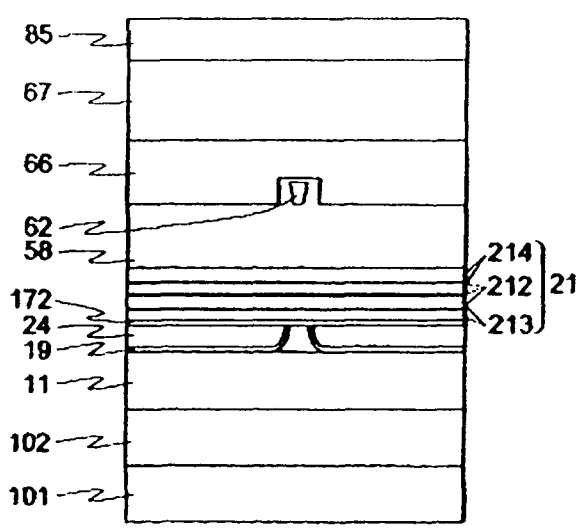
FIG. 9 is a schematic view broadly showing a structure of an air bearing surface of a magnetic sensor portion of still another magnetoresistive head of the CPP structure, according to the invention.
Figure 1:
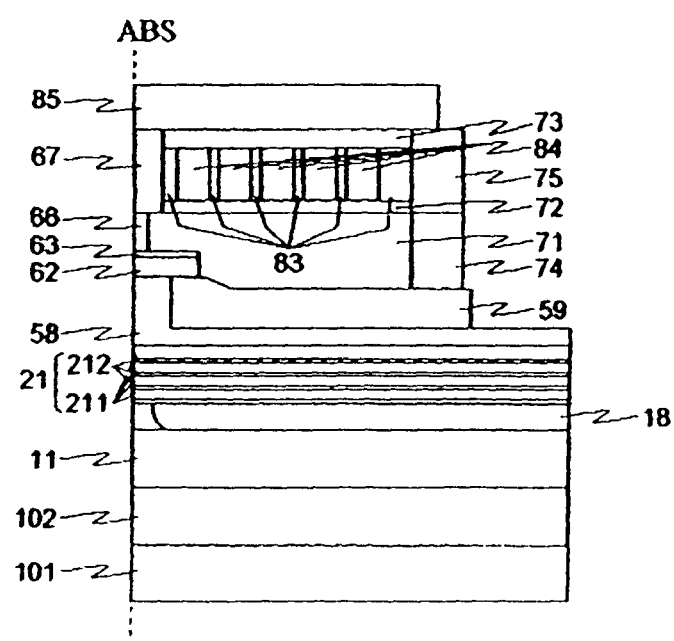

FIG. 9 is a view showing Embodiment 3 of a magnetoresistive head of the CPP structure, according to the present invention, in which a structure of an air bearing surface of a magnetic sensor thereof is shown. Thermal distortion of an upper magnetic shield layer 21 can be suppressed so as to be smaller in magnitude by increasing a fraction of low thermal expansion nonmagnetic layers 212 to magnetic layers 211, however, if a fraction of nonmagnetic layers to magnetic layers is increased, this will result in a decrease in effect of shielding unnecessary magnetic fluxes that make no contribution to readback signals.

With this embodiment, in order to solve this problem, as shown in FIG. 9, for magnetic layers 213 closer to the CPP structure sensor among magnetic layers isolated from each other by the low thermal expansion nonmagnetic layer 212, use was made of the 80 atomic percent Ni-20 atomic percent Fe alloy high in permeability while for magnetic layers 214 closer to a write head, use was made of material (a 35 atomic percent Ni-65 atomic percent alloy) with a coefficient of thermal expansion as small as $1.5 \times 10^{-6}$ (/° C.) although the same is not so high in permeability as the 80 atomic percent Ni-20 atomic percent Fe alloy. Evaluation was made in the same way as was adopted for Embodiment 1, whereupon the same results as those for Embodiment 1 were obtained in respect of thermal stability, and the external field durability. However, as a result of detailed examination on the present embodiment in respect of the thermal stability, it was found that a magnetoresistive ratio after the annealing was at 98% of the magnetoresistive ratio before the annealing even with an element having undergone the largest deterioration in magnetoresistive ratio, proving that deterioration has hardly occurred. This therefore suggests that the structure according to the present embodiment is effective in the case of a higher annealing being applied.

Furthermore, for the magnetic layers 214, use can be made of an Ni—Fe base alloy containing Ni in a range of 30 to 80 atomic percent besides the 35 atomic percent Ni-65 atomic percent alloy. In FIG. 9, there is shown a structure where the upper magnetic shield layer 21 comprises the magnetic layers in four layers, and for the magnetic layers in two layers among magnetic layers closer to the CPP structure sensor, use was made of the 80 atomic percent Ni-20 atomic percent Fe alloy high in permeability while for the magnetic layers in two layers closer to the write head, use was made of the material smaller in a coefficient of thermal expansion. However, the above is shown simply by way of example, and as for magnetic layers, the number of layers thereof may differ from the number described as above while the numbers of respective magnetic layers need not be identical.

Embodiment 4

FIG. 10 is a view showing Embodiment 4 of a magnetoresistive head of the CPP structure, according to the invention, in which a sectional structure thereof, in the direction of a sensor height, is shown.

The height of a shield layer can be set closer to a write head for perpendicular magnetic recording, in consideration of point (1) for prevention of occurrence of writing to a recording medium, due to a magnetic field generated by current flowing through coils, and point (2) for instability in read-performance of a read head of the CPP structure, accompanying reading operation. The point (1) is concerned with prevention of the occurrence of writing to the perpendicular magnetic recording medium, due to the magnetic field generated by current flowing through the coils, entering the shield layer, thereby undergoing localized convergence on an air bearing surface, and to that end, it will be effective to render a height of the shield layer closer to the write head, which is an upper magnetic shield layer 21 in this case, equivalent to that of a yoke 59 as with the case of Embodiment 1, or render the upper magnetic shield layer 21 shorter in length than the yoke 59. Meanwhile, the point (2) is concerned with the read-performance instability, attributable to either magnetization of the shield layer becoming unstable after the reading operation, thereby affecting a free layer 16 of the read head of the CPP structure, or to the free layer 16 being directly affected by a magnetic field generated at the time of the writing operation. In order to prevent this problem, the shield layer 21 is rendered greater in height than at least a back-gap 74 as shown in FIG. 10, thereby suppressing the instability in the read-performance.

Which countermeasure is to be adopted, either one as per point (1) or the other as per point (2), will depend on the structure of the perpendicular magnetic recording medium, the structure of the magnetic head, and combination thereof, so that it is necessary to make a determination as appropriate.

Embodiment 5

With Embodiment 1, the film made of Cu (2 nm) was used as the first upper gap layer 171 of the CPP-GMR film. The protection described comprises a part of the gap layer of the read head of the CPP structure, and by use of material small in coefficient of thermal expansion for the same, enhancement in thermal stability is anticipated. Rh was selected as a metal for causing a sensing current to pass therethrough, having coefficient of thermal expansion less than $16.5 \times 10^{-6}$ (/° C.) for Cu, taking into account a role of preventing from oxidation, and so forth, and further, Rh was used for a second upper gap layer 172 as well. The coefficient of thermal expansion of Rh is $8.3 \times 10^{-6}$ (/° C.) equivalent to about ½ in value of the coefficient of thermal expansion of Cu. Evaluation on the thermal stability was made in the same way as was adopted for Embodiment 1, whereupon a yield of the magnetic head according to the present embodiment was found unchanged at 100%, and results of evaluation made on deterioration in the external field durability, after the annealing, showed that a magnetoresistive ratio remained at 98% of the magnetoresistive ratio before the annealing even with an element having undergone the largest deterioration in magnetoresistive ratio, thereby proving that the present embodiment was effective.

Now, Rh for use in the first upper gap layer 171, or the second upper gap layer 172 is described as above by way of example, however, besides Rh, use can be made of any element selected from the group consisting of Cr, Zr, W, Ta, Ti, Nb, Pt, V, Pd, and Mo.

Figure 12:
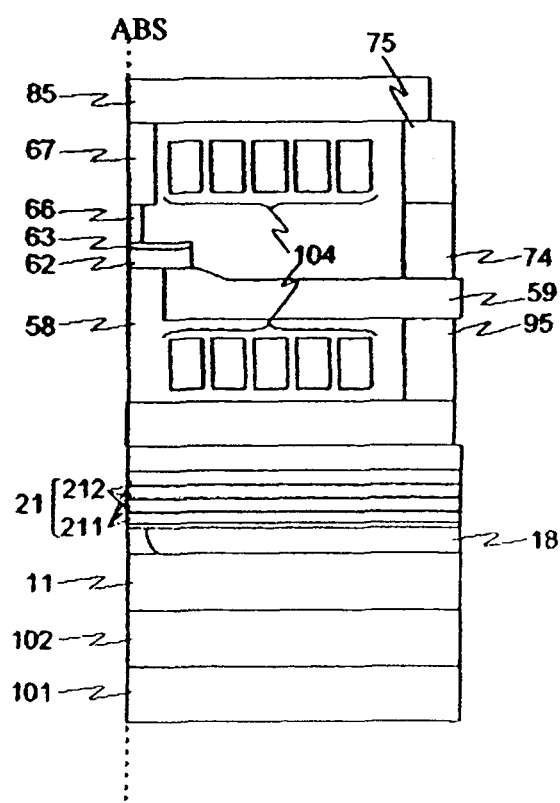
FIG. 12 is a schematic view showing a write head for perpendicular magnetic recording, having a helical coil structure.
Figure 13:
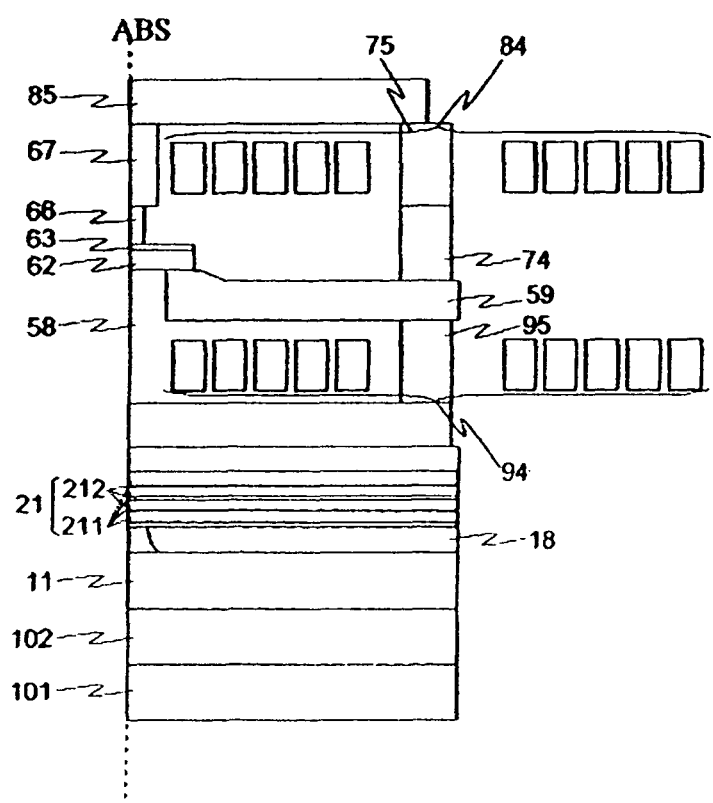
FIG. 13 is a schematic view showing a write head for perpendicular magnetic recording, having a dual pancake structure.

For a structure of coils through which a recording current for generating a recording magnetic field of the write head for perpendicular magnetic recording is caused to flow, use may be made of a helical coil structure wherein the coils 104 are turned around the main pole 62 and the yoke 59 in the vertical direction as shown in FIG. 12, or a dual pancake coil structure wherein coils 84 above the main pole 62 and the yoke 59 are wound in a direction reverse from a direction in which lower coils 94 are wound, as shown in FIG. 13. Since the same problems occur even with the adoption of the write head for perpendicular magnetic recording, using a different coil structure as above, there will be no change in the advantageous effects of embodiments in accordance with the present invention.

In the various embodiments described in the foregoing, with the use of a magnetoresistive film where an intermediate layer is a barrier layer, utilizing the TMR effect thereof, and one where an intermediate layer is an electrically conducting layer, making use of the CPP-GMR effect thereof, similar advantageous effects can be obtained. Further, advantageous effects of the invention are similarly obtained with a device wherein a sensing current is caused to flow so as to penetrate a film interface of a material of a magnetoresistive sensor, such as one making use of a magnetic semiconductor, one utilizing diffusion/accumulation phenomena of polarized spin, and so forth.

In this case, the materials of the antiferromagnetic layer 13, the pinned layer 14, and the free layer 16, respectively, are not limited to those previously described, and for the antiferromagnetic layer 13, use may be made of an antiferromagnetic layer made of a Mn—Ir alloy, and so forth, or a hard magnetic layer made of a Co—Pt base alloy, Co—Cr—Pt base alloy, and so forth, besides the Pt—Mn base alloy. Further, for the pinned layer 14, and the free layer 16, use can be made of a Co—Ni—Fe alloy, a high polarization material such as magnetite, Heusler alloy, and a stacked layer film thereof. Furthermore, use may be made of a multilayered film made up of pinned ferromagnetic layers with a metal layer not more than 1 nm thick, sandwiched therebetween.

Further, the lower gap layer 12, the first upper gap layer 171, and the second upper gap layer 172 are not indispensable, and need not be provided unless required from a structural point of view, or from the viewpoint of a manufacturing process.

Still further, the magnetoresistive head wherein the magnetoresistive sensor is disposed so as to be exposed to the air bearing surface is described in the foregoing, however, even with a magnetoresistive head wherein the magnetoresistive sensor is disposed away from the air bearing surface so as not to be exposed to the air bearing surface at all, or to be partially exposed thereto, advantageous effects of embodiments of the present invention are similarly obtained.

As to a positional relationship between the read head of the CPP structure, and the write head for perpendicular magnetic recording, the read head of the CPP structure need not necessarily be disposed on the side of the substrate, and the write head for perpendicular magnetic recording may be disposed on the side of the substrate.

Figure 14:
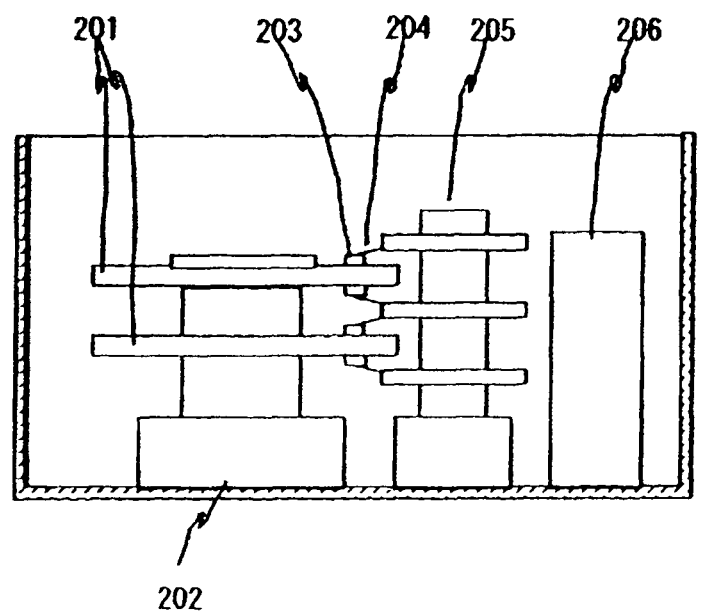
FIG. 14 is a schematic view showing one embodiment of a magnetic storage apparatus according to the invention.

With the use of the magnetic head of the CPP structure for perpendicular magnetic recording as described in detail as above, it is possible to provide a magnetic storage apparatus having a high recording density, excellent in the external field durability, and read performance. FIG. 14 is a schematic view showing one embodiment of the magnetic storage apparatus according to an embodiment of the present invention. The magnetic storage apparatus includes a magnetic disk 201 for magnetically writing information, a motor 202 for rotating the magnetic disk 201, magnetic heads 203 for writing to, and reading from the magnetic disk 201, respectively, suspensions 204 for supporting the magnetic heads 203, respectively, an actuator 205 for positioning the magnetic heads 203, respectively, and a read/write circuit 206 for processing the information (a write/readback signal). The magnetoresistive head that has been described in detail as above is used as the read head of each of the magnetic heads 203. By combining the plural magnetic storage apparatuses with each other, a disk array apparatus can be assembled. In such case, since the plural magnetic storage apparatuses are concurrently handled, it is possible to improve capacity for processing information at high speed, and to enhance reliability of the system.

What is claimed is:

1. A magnetic head comprising:
a write head for perpendicular magnetic recording, having a main pole and a return pole; and
a read head incorporating a magnetoresistive film comprising magnetic layers stacked through an intermediate layer, formed between an upper magnetic shield layer, and a lower magnetic shield layer, a sensing current flowing so as to penetrate respective interfaces between the magnetic layers stacked,
wherein at least either shield layer of the upper magnetic shield layer, and the lower magnetic shield layer, disposed closer to the write head for perpendicular magnetic recording, is made up so as to have a planar multi-layered structure made of alternating layers of: a magnetic material layer, and a non-magnetic material layer,
wherein the non-magnetic material layer comprises a low thermal expansion non-magnetic material having a coefficient of thermal expansion smaller than that of the magnetoresistive film, and
wherein the planar multi-layered structure comprises at least two non-magnetic material layers and at least two magnetic material layers.

2. The magnetic head according to claim 1, wherein the low thermal expansion non-magnetic material has a coefficient of thermal expansion smaller than a coefficient of thermal expansion of an 80 atomic percent Ni-20 atomic percent Fe alloy, and wherein the low thermal expansion non-magnetic material has a coefficient of thermal expansion smaller than about $13.3 \times 10^{-6}$(/° C.).

3. The magnetic head according to claim 1, wherein each magnetic material layer is directly adjacent a non-magnetic material layer in the planar multi-layered structure.

4. The magnetic head according to claim 1, wherein the low thermal expansion non-magnetic material comprises at least one element selected from a group consisting of Cr, Si, Zr, W, C, Ta, Ti, Nb, Pt, V, Pd, B, Mo, and Rh.

5. The magnetic head according to claim 1, wherein the multi-layered structure comprises a magnetic material layer between each layer of the low thermal expansion non-magnetic material, and wherein at least one of the magnetic material layers is made of an Ni—Fe base alloy containing Ni in a range of about 30 to 80 atomic percent.

6. The magnetic head according to claim 1, wherein a height of the shield layer having the multi-layered structure, in the direction of a sensor height, is greater than a height of a position where the main pole and the return pole are magnetically connected to each other.

7. The magnetic head according to claim 1, wherein a gap layer is provided between the shield layer having the multi-layered structure and the magnetoresistive film, and the gap layer has a coefficient of thermal expansion equivalent to, or smaller than that of the magnetoresistive film.

8. The magnetic head according to claim 7, wherein the low thermal expansion non-magnetic material of the shield layer having the multi-layered structure has a coefficient of thermal expansion equivalent to, or smaller than that of the gap layer.

9. The magnetic head according to claim 7, wherein the gap layer has a coefficient of thermal expansion smaller than that of an 80 atomic percent Ni-20 atomic percent Fe alloy.

10. The magnetic head according to claim 7, wherein the gap layer has a coefficient of thermal expansion smaller than about $13.3 \times 10^{-6}$(/° C.).

11. The magnetic head according to claim 1, wherein the intermediate layer is a tunneling barrier.

12. The magnetic head according to claim 1, wherein the upper magnetic shield layer and the lower magnetic shield layer are planar structures.

13. The magnetic head according to claim 1, wherein all of the upper magnetic shield layer is positioned above the magnetoresistive film and all of the lower magnetic shield layer is positioned below the magnetoresistive film.

14. The magnetic head according to claim 1, further comprising biasing layers positioned on either side of the magnetoresistive film in a track width direction.

15. A magnetic storage apparatus comprising:
a magnetic disk;
a disk rotating means for rotating the magnetic disk;

magnetic heads for writing information to, and reading information from the magnetic disk, respectively;

an actuator for positioning the magnetic heads against the magnetic disk, respectively, said magnetic heads each comprising:

a write head for perpendicular magnetic recording, having a main pole and a return pole;

a read head incorporating a magnetoresistive film comprising magnetic layers stacked through an intermediate layer, formed between an upper magnetic shield layer, and a lower magnetic shield layer, a sensing current flowing so as to penetrate respective interfaces between the magnetic layers stacked, wherein at least either shield layer of the upper magnetic shield layer, and the lower magnetic shield layer, disposed closer to the write head for perpendicular magnetic recording, is made up so as to have a planar multi-layered structure with magnetic layers and other layers made of alternating, directly adjacent layers of: a magnetic material layer, and a non-magnetic material layer, wherein the non-magnetic material layer comprises a low thermal expansion non-magnetic material having a coefficient of thermal expansion smaller than that of the magnetoresistive film.

16. The magnetic storage apparatus according to claim 15, wherein the low thermal expansion non-magnetic material has a coefficient of thermal expansion smaller than a coefficient of thermal expansion of an 80 atomic percent Ni-20 atomic percent Fe alloy, and wherein the low thermal expansion nonmagnetic has a coefficient of thermal expansion smaller than about $13.3 \times 10^{-6} (/^\circ C.)$.

17. The magnetic storage apparatus according to claim 15, wherein the planar multi-layered structure comprises at least two non-magnetic material layers and at least two magnetic material layers.

18. A magnetic head comprising:

a write head for perpendicular magnetic recording, having a main pole and a return pole; and a read head incorporating a magnetoresistive film formed between an upper magnetic shield layer and a lower magnetic shield layer, a sensing current flowing so as to penetrate respective interfaces between the magnetic layers stacked, wherein the magnetoresistive film includes an antiferromagnetic layer, a pinned layer, an intermediate layer, a free layer, and a capping layer, wherein at least either shield layer of the upper magnetic shield layer, and the lower magnetic shield layer, disposed closer to the write head for perpendicular magnetic recording, is made up so as to have a planar multi-layered structure comprising at least three alternating layers of: a magnetic material layer, and a non-magnetic material layer, wherein the non-magnetic material layer comprises a non-magnetic material having a coefficient of thermal expansion smaller than that of the free layer.

19. The magnetic head according to claim 18, wherein the free layer is formed of a Ni—Fe alloy whose Ni content is about 75 atomic percent or more and about 85 atomic percent or less, and wherein each magnetic material layer is directly adjacent a non-magnetic material layer in the planar multi-layered structure.

20. The magnetic head according to claim 18, wherein a shield layer, disposed on a side of the magnetic head closer to the write head for perpendicular magnetic recording, comprises a first magnetic layer having a first coefficient of thermal expansion and a second magnetic layer having a second coefficient of thermal expansion, wherein the second coefficient of thermal expansion is lower than the first coefficient of thermal expansion, and wherein the second magnetic layer is disposed between the first magnetic layer and the write head for perpendicular magnetic recording.

21. The magnetic head according to claim 18, wherein the non-magnetic material contains at least one element selected from a group consisting of Cr, Si, Zr, W, C, Ta, Ti, Nb, Pt, V, Pd, B, Mo, and Rh, and wherein the planar multi-layered structure comprises at least two non-magnetic material layers and at least two magnetic material layers.

22. The magnetic head according to claim 18, wherein the intermediate layer is a tunneling barrier.

* * * * *